United States Patent [19]

Bauer

[11] Patent Number: 5,704,780
[45] Date of Patent: Jan. 6, 1998

[54] APPARATUS FOR THERMAL PROCESSING OF RAW MATERIALS IN DUST FORM

[75] Inventor: Claus Bauer, Köln, Germany

[73] Assignee: Deutz AG, Cologne, Germany

[21] Appl. No.: 541,869

[22] Filed: Oct. 10, 1995

[30] Foreign Application Priority Data

Oct. 15, 1994 [DE] Germany .................. 44 36 939.5

[51] Int. Cl.⁶ .................. F27B 7/00; F27B 15/00
[52] U.S. Cl. .................. 432/106; 432/14; 432/58
[58] Field of Search .................. 432/14, 58, 106

[56] References Cited

U.S. PATENT DOCUMENTS

| | | | |
|---|---|---|---|
| 4,295,823 | 10/1981 | Ogawa et al. | 432/14 |
| 4,496,396 | 1/1985 | Steinbiss et al. | 432/106 |
| 4,541,245 | 9/1985 | Becker et al. | 432/106 |
| 4,955,986 | 9/1990 | Maury et al. | 432/106 |

OTHER PUBLICATIONS

German language Journal "Zement-Kalk-Gips" No. May 1978, pp. 236–238, w/English translation.

*Primary Examiner*—Henry A. Bennett
*Assistant Examiner*—Gregory Wilson
*Attorney, Agent, or Firm*—Hardaway Law Firm, P.A.; Charles L. Schwab

[57] ABSTRACT

A partial flue gas stream is extracted from the rotary kiln of a cement plant. This partial bypass of hot flue gas is passed through a cooler (23) and then passed through a dust collector (24). Fine granular dust (30) from the dust collector (24) is fed directly to a dust collecting vessel. The coarse granular dust (28, 29) from the dust collector (24) is fed to a suspension type cyclone heat exchanger (33) operated directly with cooling air (32) and there cooled by means of direct heat transfer. The heated cooling air (39) extracted from the hot dust cooler (33) by a draft fan (40) is fed to the partial flue gas stream, such as by feeding it to the gas stream cooler (23).

8 Claims, 1 Drawing Sheet

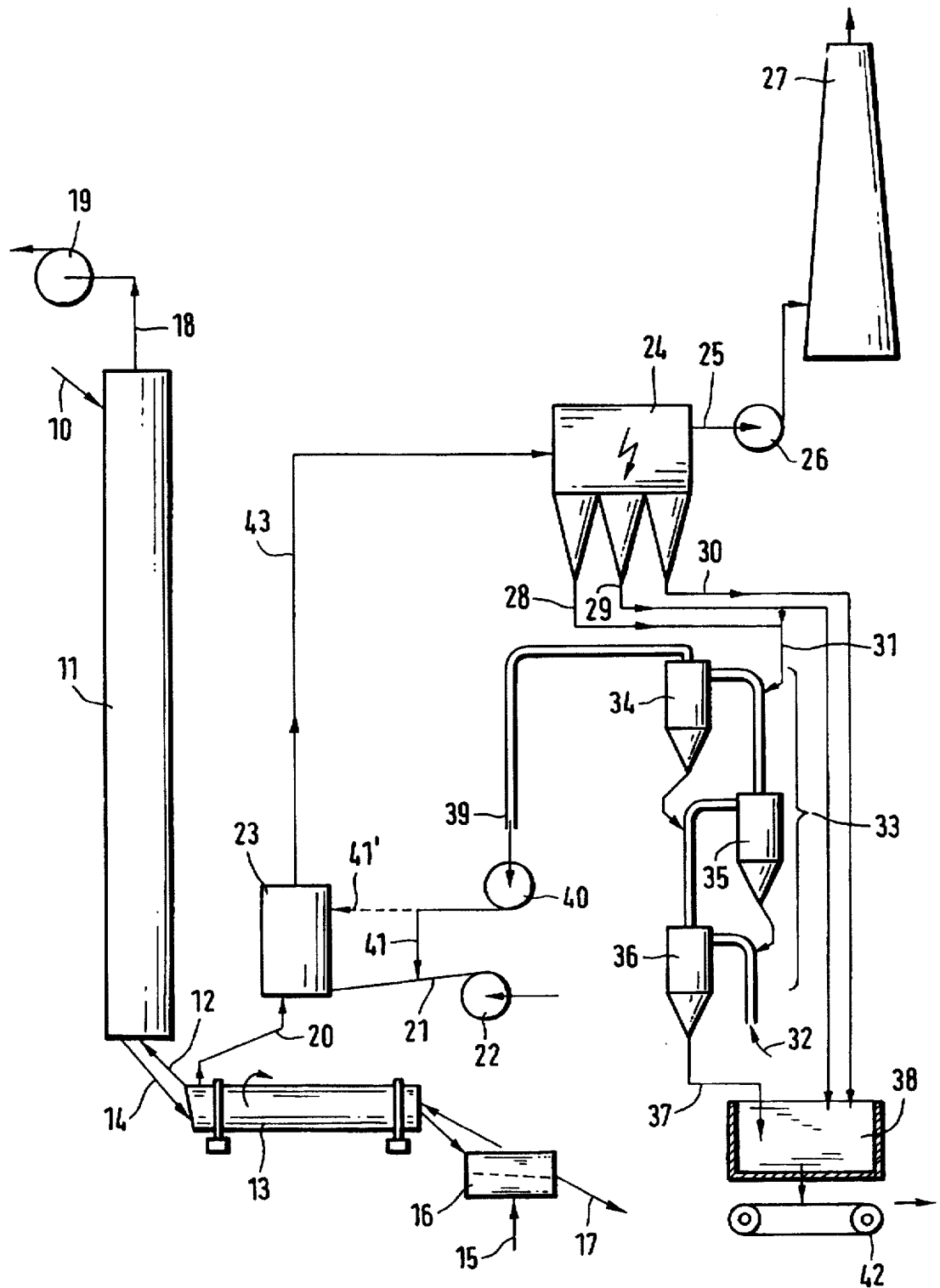

APPARATUS FOR THERMAL PROCESSING OF RAW MATERIALS IN DUST FORM

TECHNICAL FIELD

This invention relates to an apparatus for the thermal processing of raw materials in dust form, in particular for the production of cement clinker from raw meal, which is preheated in at least one heat exchanger through which flue gas of a rotary kiln flows. Part of the rotary kiln flue gas is bypassed in a substream which is cooled and from which dust is collected.

BACKGROUND OF THE INVENTION

In cement technology it is known that many feeds to cement clinker production contain incidental components such as, for example, alkali compounds, sulfur, chlorine, heavy metals, etc., which vaporize in the region of the sintering zone to form, for example, alkali chloride and alkali sulfate compounds which then recondense in the preheating zone, thus creating cycles, by which quality of the cement clinker is lowered and the combustion process itself may be adversely affected. In order to suppress an alkali cycle in a cement clinker burning installations and also to reduce the alkali content in the cement clinker, it is known to divert and withdraw a part of the kiln flue gases containing alkali compounds, by means of a so-called bypass gas offtake or partial gas offtake in the lower region of the flue gas riser pipe between the rotary kiln and the suspension-type gas preheater, thus at a temperature level at which the volatile components are not yet, or only partially, condensed. If the extracted bypass gas as well as the kiln dust entrained therewith contain high levels of alkali, the bypass gas as well as, if appropriate, also the kiln dust or bypass gas dust separated therefrom must be disposed of. This aspect of cement production is discussed in an article "Problems of Electrostatic Dust Precipitation from High Alkali-Chloride Exit Gases from Gas Bypasses of Suspension Preheater Kilns," in the German-language journal "Zement-Kalk-Gips," No. 5/1978, pages 236 to 238.

It is known that the partial gas stream withdrawn from the cement clinker production line is usually cooled with cold fresh air and water and then subjected to dust collection in an electrostatic precipitator. For a variety of reasons, water cooling of the partial gas stream must be omitted, so that the partial gas stream can only be cooled with ambient air. In order to avoid excessively large gas masses, and thus also excessively expensive electrostatic precipitators, the partial gas stream in such cases is cooled only to approximately 300° to 400° C. with ambient air, and hot gas dust collection also takes place at this temperature. Dust collection efficiencies satisfying the legislative provisions are achieved. While the cleaned partial gas stream is released into the environment, the hot dust separated from it is collected in hoppers of the electrostatic precipitator and stored in a dust storage device. For its further treatment or processing such as, for example, compacting, the hot dust often has to be cooled, because dust compacting with water as binding agent is possible only with cooled or cold dust.

The cooling of the hot bypass dust may be accomplished in two ways: indirectly, for example in cooling screws, or directly by cooling with air. In indirect cooling of the hot dust in large installations, such as those for 10 t/h and larger quantities of hot dust, a very large number of cooling screws would be required, because the heat-transfer area is small and the aerated dust bed inside the cooling screw represents an insulating layer that hinders heat transfer. Deposits in the screw cooler in the form of crusts further interfere with heat transfer. The consequence is a high maintenance cost, so that the use of cooling screws remains restricted to small installations only. Direct cooling of the hot dust with air is possible for large installations; however, the suspension of cooling air and dust particles discharged from the hot dust cooler would have to be separated in a separate dust collection device before the heated cooler exhaust air could be released into the atmosphere. Such a separate dust collection device would be costly, because the dust to be separated consists in part of very fine sublimed particles that cannot themselves be retained in the hot dust cooler. Experience has shown that very large-area bag filters would have to be used for this purpose, which are characterized by high investment and operating costs.

OBJECTS AND SUMMARY OF THE INVENTION

It is an object of this invention to provide a cement plant having a partial gas offtake for the extraction of a partial stream of the flue gas from a rotary kiln with the partial gas stream being cooled by a bypass dust cooler and the hot bypass dust being removed from the partial gas stream by a dust collection device, and including a cooler for handling large throughputs for the cooling of the hot bypass dust, without a separate dust collection device being required for the exhaust air of the bypass dust cooler.

In the present invention, the hot dust cooler, which cools at least the coarse granular components of the dust separated from partial gas stream by the dust collection system, is a hot dust cooler in which the hot dust is cooled by cooling air in a direct heat transfer manner. The cooling air extracted from the hot dust cooler, heated and burdened with extremely fine entrained dust, is injected, as by its own draft fan, directly into the partial gas stream cooler or into the mixing chamber of such cooler. There is no need for a separate dust collection device for the exhaust air of the hot dust cooler, since the cooler exhaust air, after it has been utilized for cooling of the partial gas stream diverted from the rotary kiln flue gas, is subjected to dust collection together with the partial gas stream, in the dust collector (electrostatic precipitator) already required for the partial gas stream. The fine granular material of the hot bypass dust discharged from the partial gas stream dust collector is advantageously not injected into the hot dust cooler directly operated with cooling air, but bypasses that cooler in order to prevent the fine granular component of the bypass dust from building up in the system, which could lead to increased emissions of dust at the stack. The heat from the bypass dust is recycled into the partial gas stream by feeding the heated cooler exhaust air of the bypass dust cooler to the partial gas stream cooler.

In accordance with a special feature of the invention, the hot dust cooler operated directly with cooling air includes a suspension-type cyclone heat exchanger system characterized by a countercurrent/concurrent combination having at least one cyclone stage, and it may have two or three cyclone stages. From the uppermost cyclone stage of the cyclone cooler system operating at high efficiency, the cooler exhaust air exits, already largely freed of bypass dust, and the residual dust is separated in the dust collection device already required for the partial gas stream, such as, for example, the electrostatic filter.

BRIEF DESCRIPTION OF THE DRAWING

An exemplary embodiment of the invention is illustrated schematically in the drawing.

DETAILED DESCRIPTION OF THE DRAWING

The drawing shows an apparatus for the production of cement clinker from cement raw meal, which is inlet at (10) to the preheater stage (11) in the form of a suspension-type cyclone heat exchanger system, where it passes through a plurality of cyclone stages in combined concurrent/ countercurrent to the hot flue gas (12) of a rotary kiln (13) or of a calcination stage in order to be admitted as highly (e.g., 95%) calcined cement raw meal (14) to the inlet chamber of the rotary kiln (13). In the sintering zone of the rotary kiln (13) the calcined raw material is burned to cement clinker, which is then cooled in a clinker cooler (16) supplied with fresh air (15). In the exemplary embodiment of the invention the cooler (16) is a pusher grate cooler. The cooled cement clinker leaves the clinker cooler (16) at a discharge (17). The flue gas cooled against the cement raw meal leaves the preheater stage (11) of the installation at a discharge (18). This flue gas is conveyed by a draft fan (19) through flue gas coolers and dust collectors to a main stack, not illustrated, and there discharged from the cement plant.

Connected to the inlet chamber of the rotary kiln (13) is a partial gas offtake line (20), by which about 5 to 50% of the hot (approximately 1200° C.) rotary kiln flue gas is withdrawn as a hot contaminated bypass or partial gas stream. This partial gas stream is cooled to approximately 300° to 400° C. in a cooler (23) by the admixture of fresh air (21), which is delivered by a fan (22), before the partial gas stream is next freed of its hot bypass dust by a separator, for example an electrostatic dust collector or electrostatic precipitator (24). The cleaned partial gas stream (25) is extracted by a draft fan (26) and a stack (27).

The hot bypass dust separated in the electrostatic precipitator (24) is collected in three dust collecting hoppers. Specifically, the coarse granular dust falls into the left-hand hopper (28), the medium granular dust falls into the middle hopper (29) and the fine granular dust falls into the right-hand hopper (30). At least the coarse granular dust fraction (28) of the hot bypass dust are, by line (31), is fed into a hot dust cooler (33) operated directly with cooling air (32), that is, fresh ambient air, and there cooled by means of direct heat transfer to the cooling air (32). A valved by-pass connection between the discharge lines from hoppers (28) and (29) permit all, or part of the medium granular dust fraction to be fed to either a dust collecting vessel (38) or to the hot dust cooler (33). Advantageously, the hot dust cooler (33) operating with high efficiency directly with cooling air consists of a suspension-type cyclone heat exchanger system characterized by combined countercurrent/concurrent flow having, in the exemplary embodiment, three successive cyclone stages (34, 35 and 36). The cooling air (32) is fed into the lowermost cyclone stage (36) and the cooled hot dust (37) is withdrawn from this cyclone stage (36) into a dust collecting vessel (38). From the uppermost cyclone stage (34), the cooler exhaust air (39), heated to a maximum of 250° C., is withdrawn by its own draft fan (40) and fed through line (41) to the ambient cooling air line (21) for the partial gas stream cooler (23). The hot dust cooler exhaust air (39) does not require a separate dust collector, because this cooler exhaust air (39) has been substantially freed of dust in the existing electrostatic precipitator (24).

The discharge of the cooled coarse/medium granular bypass dust (37) from the hot dust cooler (33) and the discharge of the fine granular dust (30) from the partial gas stream dust collector (24) are combined in the dust collecting vessel (38), and from there all the bypass dust is conveyed by a conveyor (42) to its further use or disposal.

Since the fine granular dust fraction (30) of the hot bypass dust extracted from the electrostatic precipitator (24) bypasses the hot dust cooler (33), there is no chance for this fine dust to accumulate in the gas stream offtake or the integrated hot dust cooler (33).

The main mass of the stream of the hot bypass dust, specifically more than 80%, is discharged from the dust cooler (33) via line (37) as sufficiently cooled. The exhaust air (39) extracted from the hot dust cooler (33) is heated to a maximum of 250° C. and therefore can be employed without further treatment as a supplemental coolant (41) in the partial gas stream cooler (23) for the cooling of the hot (approximately 1200° C.) rotary kiln flue gas (20). The hot dust cooler exhaust air (39), instead of being totally premixed with the fresh air (21), can be partially or totally conveyed via line (41'), indicated by a dashed line, directly to the partial gas stream cooler (23).

According to experience, the fine granular dust fraction (30) of the hot bypass dust extracted from the electrostatic precipitator (24) makes up less than 10% of the total quantity of bypass dust, so that this fine granular dust component (30) can be delivered uncooled and without further treatment to the dust collecting vessel (38). By bypassing the hot fine dust component (30), it cannot interfere with the operation of the suspension-type cyclone hot dust cooler (33).

Further advantages of the invention lie in the avoidance of additional dust collection installations, the saving of energy on cooling and dust collection, and the greatly reduced cost of maintenance of the hot dust cooler (33).

In using the hot dust cooler (33) the partial gas stream electrostatic precipitator (24) is burdened with only up to approximately 2 to 5% of additional cooling air. The hot dust cooler exhaust air (39) may be fed directly into the gas/air line (43) leading to the electrostatic precipitator (24), without its being used as coolant in the partial gas stream cooler (23), and in that case the electrostatic precipitator (24) would be burdened with approximately 10 to 15% of additional air stream from the hot dust cooler (33).

A control system may be provided for the cement plant in which instrumentation and control hardware can be provided for temperature monitoring of the cooler exhaust air (39) as well as the cooled bypass dust (37), each downstream of the hot dust cooler (33), for the total cooling air supply (21+41) to the partial gas stream cooler (23), for temperature monitoring of the gas (43) upstream of the electrostatic precipitator (24), as well as also for the quantity measurement of the solid stream (37) downstream of the discharge from the hot dust cooler (33). The operation of the hot dust cooler (33) may be controlled by controls which automatically vary the output of the draft fan (40), and hence vary the air flowing through the cooler (33) in response to changes in the temperature of the cooler exhaust air (39). It is preferred that the automatic controls for the draft fan (40) require the draft fan (40) to provide a predetermined minimum air flow through the cooler (33) regardless of the temperature of the air in the cooler exhaust air (39). The operation of the partial gas stream cooler (23) may be controlled by an automatic control in which the output of the cooling air fan (22) is varied in response to changes in the temperature of the exhaust air (43) from the cooler (23). This automatic temperature responsive control of the cooling air flow supplied by the fan (22) may be configured to respond to changes in the cooler output temperatures caused by changes in temperature and/or flow of air from the fan (40) and/or changes in flow and/or temperature of the partial gas offtake (20).

What is claimed is:

1. An apparatus for the thermal processing of raw meal (10) to produce cement clinker comprising:

a rotary kiln (13) having a sintering zone in which said raw meal (10) is burned to a cement clinker, said rotary kiln (13) having a partial gas offtake (20) for extracting a substream of the rotary kiln flue gas, a heat exchanger (11) connected in flue gas receiving relation to said rotary kiln (13) and for receiving and preheating raw meal (10) prior to said raw meal (10) being delivered to said rotary kiln (13), a partial gas stream cooler (23) connected to said partial gas offtake (20), a dust collector (24);

means connecting said dust collector (24) in downstream relation to said partial gas stream cooler (23), said dust collector (24) having means for separately discharging a coarse granular dust and a fine granular dust, a hot dust cooler (33) having an offtake for heated cooling air, means feeding said coarse granular dust from said dust collector (24) to said hot dust cooler (33), said hot dust cooler (33) being supplied ambient cooling air (32) whereby said coarse granular dust is cooled by direct heat transfer and a connecting line (39) connecting said offtake of said heated cooling air from said hot dust cooler (33) to said partial gas stream cooler (23).

2. The apparatus of claim 1 wherein said hot dust cooler (33) is a suspension-type cyclone heat exchanger system of the type having a countercurrent/concurrent flow combination and having at least one cyclone stage.

3. In an apparatus for the thermal processing of raw mean (10) to produce cement clinker wherein the raw meal (10) is preheated in a heat exchanger by flue gas from a rotary kiln (13), burned to a cement clinker in the sintering zone of the rotary kiln (13) and then cooled in a downstream cooler (16), the rotary kiln (13) having a partial gas offtake (20) for extracting a substream of the rotary kiln flue gas, the combination comprising;

a partial gas stream cooler (23) connected to said partial gas offtake (20), a dust collector (24);

means connecting said dust collector (24) in downstream relation to said partial gas stream cooler (23), said dust collector (24) having means for separately discharging a course granular dust and a fine granular dust, a hot dust cooler (33), means feeding said coarse granular dust to said hot dust cooler (33);

said hot dust cooler (33) being operated directly with ambient cooling air (32) whereby said course granular dust is cooled by direct heat transfer a connecting line (39) connecting the offtake of the heated cooling air from said hot dust cooler (33) to said partial gas stream cooler (23) and a draft fan (40) in said connecting line (39) from the cooling air offtake of said hot dust cooler (33) to said partial gas steam cooler (23).

4. The apparatus of claim 3 and further comprising an automatic control for said draft fan (40) automatically changing air flow through said hot dust cooler (33) in response to changes in temperature of the cooling air discharged from said hot dust cooler (33), said automatic control maintaining a minimum quantity of air flow through said hot dust cooler regardless of temperature of the cooling air discharged from said hot dust cooler (33).

5. The apparatus of claim 4 and further comprising a cooling fan (22) connected in cooling air delivery relation to said partial gas stream cooler (23) and automatic control means connected to said cooling fan (22) automatically changing the output of said fan in response to temperature changes in said partial gas stream downstream of said partial gas stream cooler (23).

6. The apparatus of claim 1 wherein the discharge of the cooled coarse granular bypass dust (37) from said hot dust cooler (33) and the discharge of the fine granular dust (30) from said partial gas stream dust collector (24) are fed to a conveyor (42).

7. An apparatus for the thermal processing of raw meal (10) to produce cement clinker comprising:

a rotary kiln (13) having a sintering zone in which said raw meal (10) is burned to a cement clinker, said rotary kiln (13) having a partial gas offtake (20) for extracting a partial gas stream of the rotary kiln flue gas, a heat exchanger (11) connected in flue gas receiving relation to said rotary kiln (13) and for receiving and preheating said raw meal (10) prior to said raw meal (10) being delivered to said rotary kiln (13).

a partial gas stream cooler (23) connected to said partial gas offtake (20).

a dust collector (24);

means connecting said dust collector (24) in downstream relation to said partial gas stream cooler (23), said dust collector (24) having means for separately discharging a coarse granular dust and a fine granular dust, a hot dust cooler (33) having an off take for heated cooling air, means feeding said coarse granular dust from said dust collector (24) to said hot dust cooler (33), said hot dust cooler (33) being supplied ambient cooling air (32) whereby said course granular dust is cooled by direct heat transfer and a connecting line (39) connecting the offtake of the heated cooling air from said hot dust cooler (33) to said partial gas stream.

8. The apparatus of claim 7 wherein said connecting line (39) is connected to said partial gas stream downstream of said partial gas stream cooler (23).

* * * * *